G. A. BAKER & F. DU VALL.
LUMBER STACKER.
APPLICATION FILED OCT. 8, 1914.

1,188,137.

Patented June 20, 1916.
6 SHEETS—SHEET 3.

WITNESSES

INVENTORS
GEORGE A. BAKER,
FRANK DUVALL,
BY
ATTORNEYS

G. A. BAKER & F. DU VALL.
LUMBER STACKER.
APPLICATION FILED OCT. 8, 1914.

1,188,137.

Patented June 20, 1916.
6 SHEETS—SHEET 6.

WITNESSES

INVENTORS
GEORGE A. BAKER,
FRANK DUVALL,
BY
ATTORNEYS

UNITED STATES PATENT OFFICE.

GEORGE A. BAKER, OF CAMDEN, AND FRANK DU VALL, OF GRAYSONIA, ARKANSAS.

LUMBER-STACKER.

1,188,137.    Specification of Letters Patent.    Patented June 20, 1916.

Application filed October 8, 1914. Serial No. 865,706.

*To all whom it may concern:*

Be it known that we, GEORGE A. BAKER and FRANK DU VALL, citizens of the United States, residing, respectively, at Camden, in the county of Ouachita and State of Arkansas, and Graysonia, in the county of Clark and State of Arkansas, have invented certain new and useful Improvements in Lumber-Stackers, of which the following is a specification.

This invention relates to an automatic stacker for lumber for use in connection with lumber drying or treating kilns, a primary object being to automatically stack lumber in such manner as to provide for the free circulation of air and gases therethrough for the efficient treating of the lumber in the kiln.

A further object is to provide a lumber stacker which will automatically deposit the lumber upon a car or truck with transverse spacing strips arranged between each tier of the lumber and with the boards of each tier positioned in spaced relation, the boards and spacing strips being positioned in alternating sequence and superposed relation.

A further object is to provide an apparatus which will automatically deliver and deposit upon a lumber receiving car, boards which are to be treated in drying kilns, the apparatus being so arranged that the lumber receiving car will be automatically lowered a predetermined distance after each tier of lumber has been completed and further adapted to deposit upon the said tiers a plurality of transversely extending spacing strips simultaneous with the car lowering.

A further object is to provide an apparatus including a board conveyer adapted to deliver the boards to the spacing and delivering mechanism by means of which the boards are arranged in proper stack forming relation upon a car, an automatic arrangement being provided whereby the delivering spacing mechanism is automatically started and controlled by the stick of lumber or board delivered thereto by the conveyer. The delivery of each board results in the moving of those boards already deposited upon the car a distance corresponding to the width of the board just received, and in connection with the foregoing is arranged a check or stop mechanism arranged in the path of motion of the first board deposited upon the car or first board of each tier which controls the receiving and lowering mechanism of the lumber receiving car so that the car will be automatically lowered upon the completion of each tier and mechanically connected to which lowering mechanism is a device for depositing transverse spacing strips upon the tier and thus complete a cycle a repetition of which results in a lumber stack of spaced boards completely separated and out of contact with their fellow members.

A further object is to accomplish the aforementioned ends in a simple and novel manner involving no intricate mechanism which would require constant attention or would not readily withstand the hard usage by unskilled labor to which an apparatus of this class will be necessarily exposed.

With the foregoing and other objects in view which will appear as the description proceeds, the invention resides in the combination and arrangements of parts and in the details of construction hereinafter described and claimed, it being understood that changes in the precise embodiment of the invention herein disclosed, can be made within the scope of what is claimed without departing from the spirit of the invention.

In the drawings accompanying this specification and forming a part thereof, the preferable form of my invention is illustrated, in which:—

Fig. 4 is a fragmentary view in section taken on the line 4—4 of Fig. 1, Figs. 5, 6 and 7 are diagrammatic views illustrating the manner in which the members of each tier are delivered to and deposited upon the lumber receiving car and the automatic controlling mechanism whereby the members are moved upon the car a certain distance and the manner in which the first board of each tier upon reaching its final position will contact with a stop lever and actuate the same resulting in the lowering of the completed tier and sub-tiers and thus providing for the multifarious repetition of the cycle.

Referring to the drawings in which similar reference numerals designate corresponding parts throughout the several views, four upright columns 15 are rigidly anchored at their lower extremities and support the platform 16 thereabove, suitable column heads 17 being provided whereby the securement of the platform to the columns, resulting in their mutual reinforcement, is effected.

A carriage 18 is movably mounted intermediate the columns and is guided in its movement by the bearing sleeves 19 with which it is provided and which slidably engage the columns 15 which project therethrough. The carriage is adapted to support the car 20 and to this end is provided with the track 21 adapted to register and aline with the track 22 leading to the kiln though it is to be understood in this connection that the apparatus herein described may be used for the stacking of lumber or material of allied dimensions for purposes of seasoning and drying either artificial or otherwise. The elevating mechanism for the carriage consists of the outstanding threaded sleeves 23 mounted upon the carriage and engaging the threaded elevating shafts 25, the latter being mounted at their lower extremities in the thrust bearings 26 and at their upper extremes in the bearings 27. Beveled gears 28 are carried by and mounted at the upper extremes of the elevating shafts and provide for their mechanical rotation for the raising and lowering of the carriage.

Figure 1:
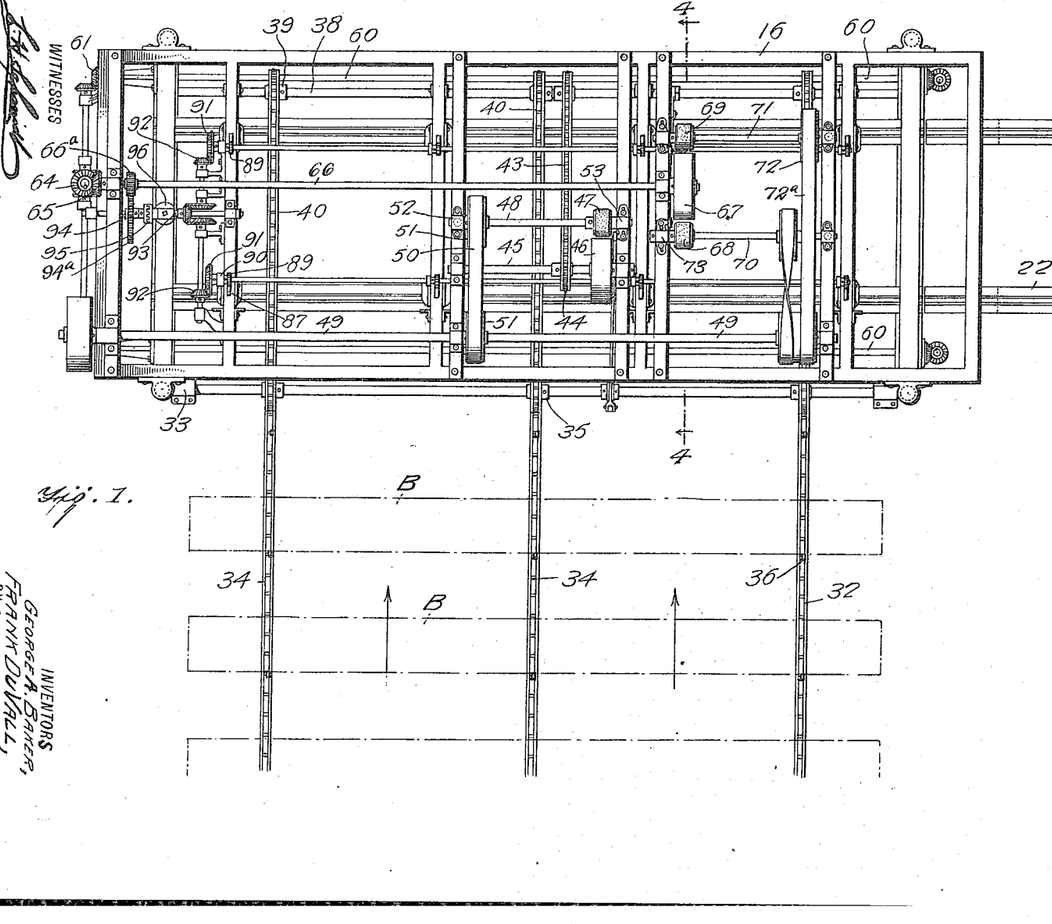
Figure 1 is a top plan view of the lumber stacker.
Figure 2:
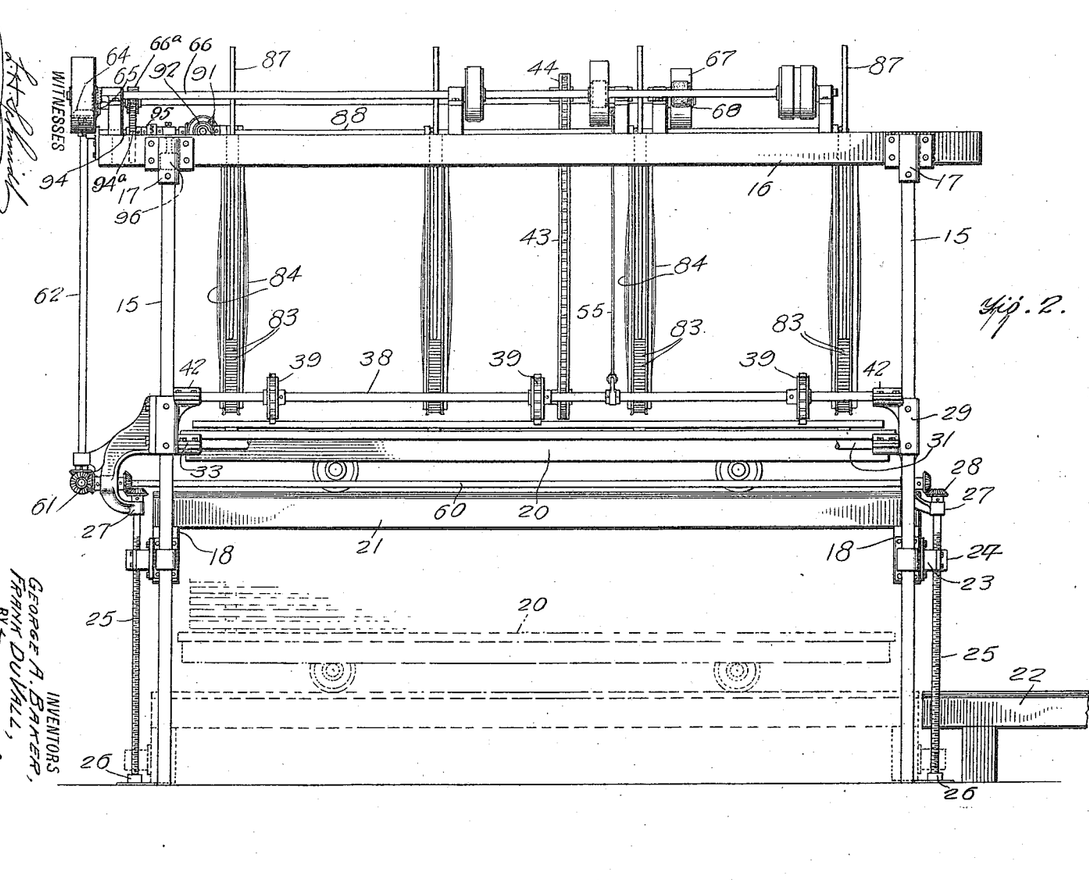
Fig. 2 is a front view in elevation thereof.
Figure 3:
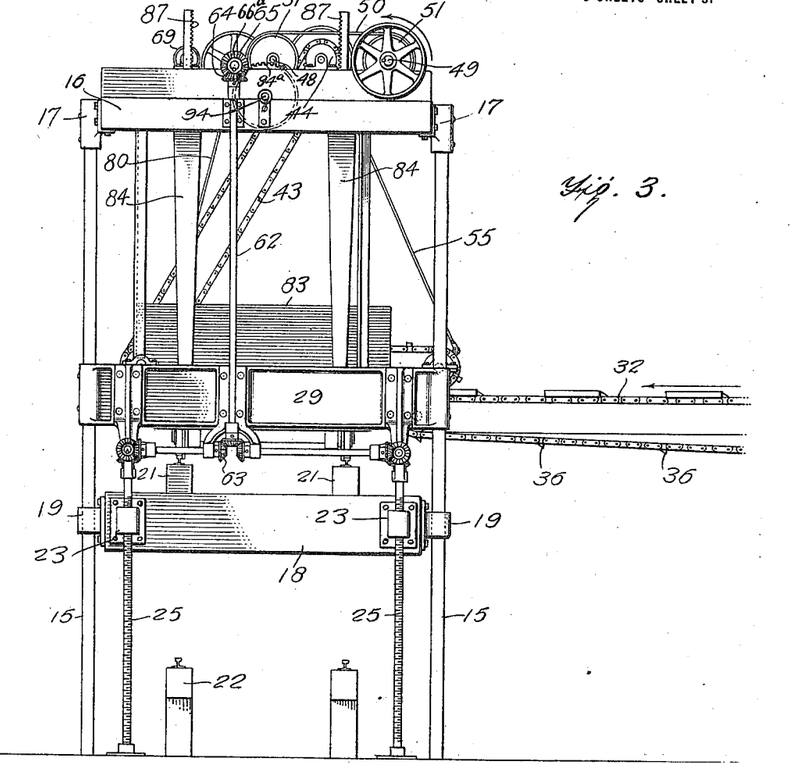
Fig. 3 is a view in side elevation of the foregoing.
Figure 4:
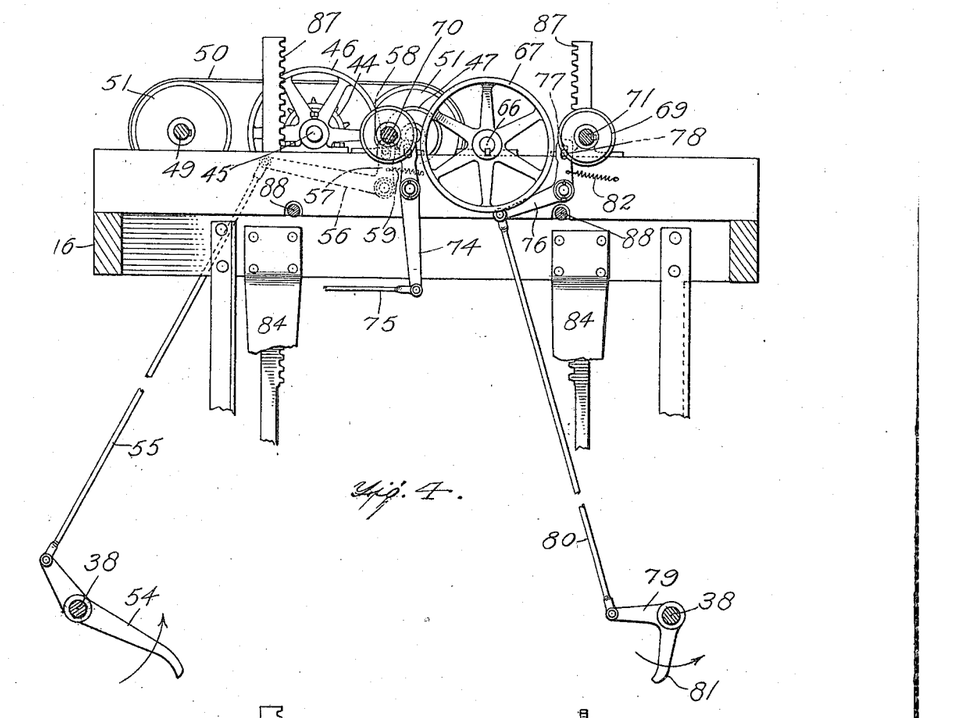

A pair of side beams 29 are rigidly secured to and supported by the columns 15 on which the shaft 31 of the delivery conveyer 32 is journaled, the rotatable connection or support being effected by the bearings 33. The delivery conveyer includes the spaced chains 34 passing over the sprocket wheels 35 carried by a shaft 31 and are provided with a plurality of upstanding spaced alined spurs 36. The said spurs are adapted to contact with the rear extremities of the boards B and move the same in parallel relation as illustrated in Fig. 1 so as to deliver them to the spacing and arranging conveyer 37 for their subsequential deposit or delivery and spaced arrangement upon the car 20.

The spacing and arranging conveyer includes the two longitudinally extending shafts 38 extending along the front and rear edges of the frame 15—16, provided with the sprocket wheels 39 around which the conveyer chains 40 extend. These chains are provided with the outwardly extending board engaging members or lugs 41 adapted to engage the rear edge of the boards as they are delivered therebeneath by the delivery conveyer 32. The spacing and arranging conveyer shafts are mounted within the bearings 42 and are rotatably driven by the chain 43 the latter extending around the sprockets 44 mounted upon and driven by the jack shaft 45 of the platform 16. The jack shaft is provided with the friction wheel 46 intermittently driven by the friction gear 47 of the shaft 48. The shaft 48 is connected to and driven from the main driving shaft 49 by means of the belt 50 and pulley wheels 51. The shaft 48 is mounted at one extremity within the bearing 52 and at its remote extremity within the shiftable bearing 53 the latter being arranged in close proximity to the friction gear 47 so that its movements will result in the engagements and disengagements of the friction wheels 46—47.

Figure 5:
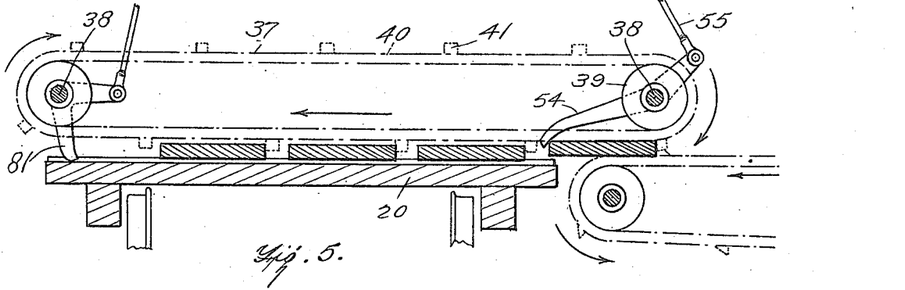

The meshing of the friction gears 46—47 results in the actuation of the spacing and arranging conveyer and in order to properly time, and control the duration of, its movements the wiping arm 54 is provided and is connected by the link 55 to the bell crank lever 56. The bell crank lever is provided with a slotted arm 57 engaging the pin 58 carried by the shiftable bearing 53. The wiper arm is arranged in the path of motion of the boards as they are projected from the delivery conveyer. A board striking the wiper arm raises the same as disclosed in Fig. 5 throwing the gear 46—47 in mesh resulting in the actuation of the chains 40, the board engaging members 41 will then contact with the rear edge of the boards and move the same across the car until such time as the board passes beyond the wiper arm releasing the same and as disclosed in Fig. 6 allow it to swing downwardly for the disengagement of the friction gears. A spring 59 engages the bell crank lever 56 and is adapted to normally maintain the friction gears out of mesh and the spacing and arranging conveyer stationary. The next board as it comes from the delivery conveyer 32 engages the wiper arm, actuates the spacing conveyer and moves the first board along the car so as to occupy a position in advance and spaced from the second board which then occupies the initial position of the first board. In like manner each arriving board moves the entire boards of the tier along the car until the tier becomes complete. Inasmuch as the rear extremity of the boards determine the time of releasement or disengagement of the gears, boards of irregular width may be successfully incorporated in each tier, it being only necessary that the first board of each tier be of a predetermined and constant width so that its forward free edge will engage the elevating lever at the proper time and actuate the raising and lowering mechanism for the carriage.

The elevating shafts 25 are driven from the two longitudinally extending shafts 60, the same being provided with the beveled gears 61 meshing with the beveled gears of the elevating shafts and driving the same. A vertical shaft 62 drives the two mentioned longitudinal shafts 60 through the instrumentality of the beveled gears and shafting 63. The upper extremity of this vertical shaft is provided with a beveled gear 64 meshing with and driven by the beveled gear 65 of the shaft 66. The shaft 66 has the friction gear 67 mounted thereon and adapted to be engaged by the friction gears 68 and 69 of the forward and reversing jack shafts 70 and 71. These jack shafts are provided with shiftable bearings 73 whereby the friction gears may be brought into engagement with the gear 67 driving the same in a forward or reversed direction resulting in the elevation or depression of the carriage and parts carried thereby. The jack shafts 70 and 71 are connected to and driven from the main driving shaft 49 by the pulleys 72 and belts 72$^a$, one of which is twisted in order to obtain the reverse movement.

The shiftable bearing 73 controlling the upward movement of the carriage is pivoted to a lever 74 to which the link 75 is secured the latter extending to a position such that it may be easily and conveniently engaged and manually operated allowing the carriage to be raised as desired. The other of the shiftable bearings 73 has the bell crank lever 76 connected thereto the connection in question being accomplished by the slotted arm 77 and pin 78 which rides therein, the latter being carried by the bearing. A bell crank lever 79 is connected to the bell crank lever 76 by the link 80 and is thus adapted to control the lowering of the carriage.

Figure 6:
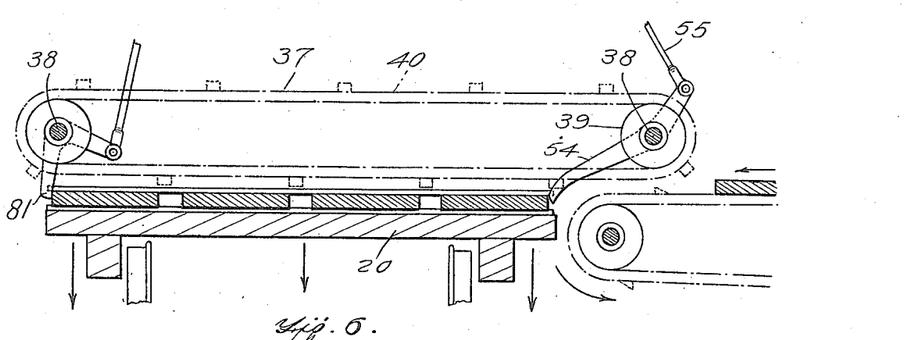
Figure 7:
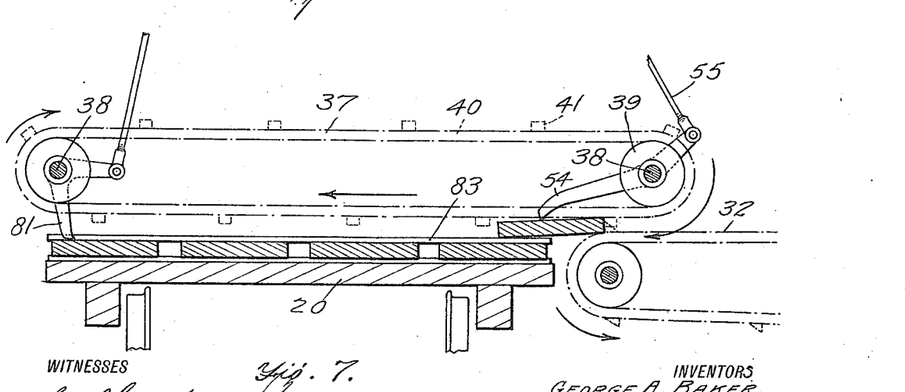
Figure 8:
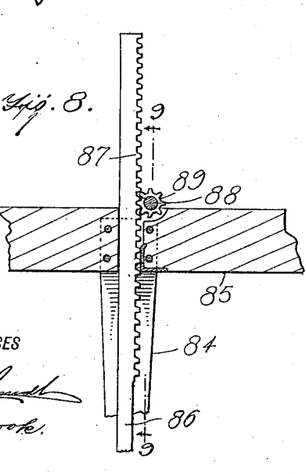
Figs. 8 and 9 are views in front and side section illustrating the actuating mechanism for depositing the transverse spacing strips.
Figure 9:
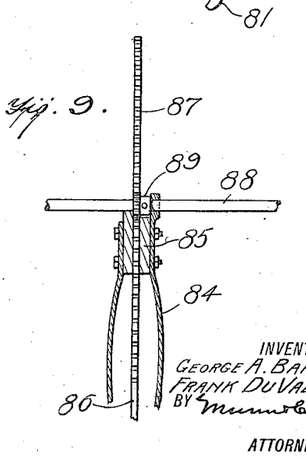
Figure 10:
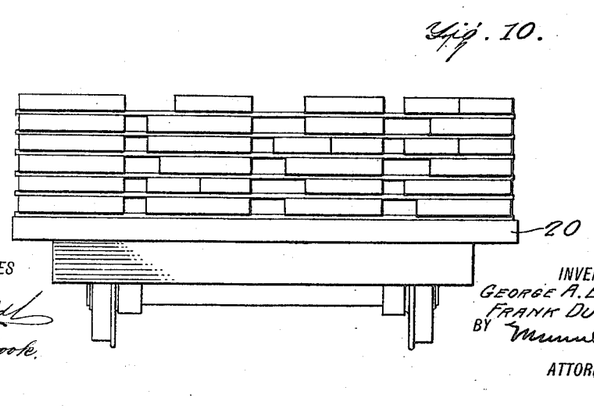
Fig. 10 is a view in front elevation of a car with a partially completed lumber stack thereon illustrating the isolated positions of each board whereby the free percolation of air through the stack is obtained.
Figure 11:
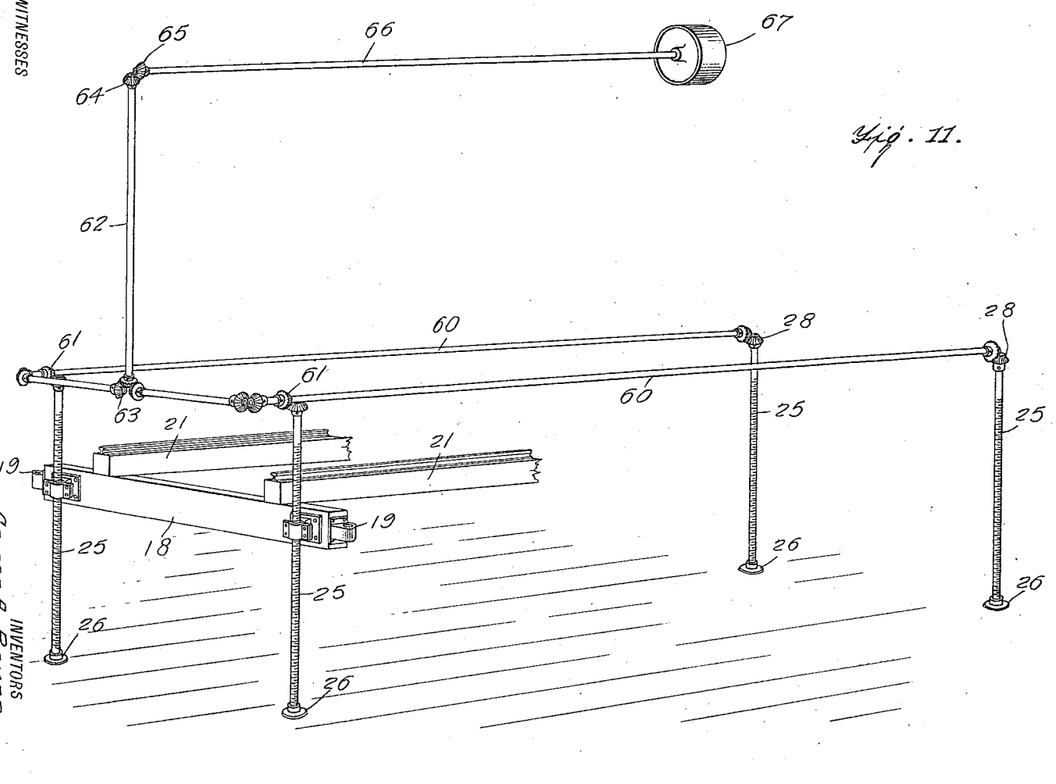
Fig. 11 is a view in perspective illustrating the driving mechanism for raising and lowering the car supporting carriage.

The bell crank lever 79 is mounted upon the shaft 38 of the spacing and arranging conveyer and includes the wiper arm 81 arranged in the path of the movements of the initial board of a tier so that as the same is moved across the car it will contact with and oscillate the wiper arm 81, as disclosed in Fig. 6, and in so doing will actuate the elevating shafts 25 and lower the carriage a distance equal to the thickness of one tier and its spacing strips. As disclosed in Fig. 6 as the carriage and tiers are lowered they pass beneath the wiper arm 81 allowing the same to return to its original and normal position as per in Figs. 5 and 7 thus disengaging the gears 67—69 and preventing further movement of the carriage. The spring 82 engages the bell crank lever 76 and provides for the return of the wiper arm 81 to its original position as the initial board of the tiers sinks therebelow.

Upon the completion of each tier and either subsequently to or simultaneously with the depression of the carriage are deposited upon the uppermost tier the spacing strips 83 the same extending transversely thereacross and adapted to receive the next tier of boards thereon and maintain the same superimposed above the last deposited tier. In order to accomplish the foregoing the resilient members 84 maintained in spaced relation by and secured to the cross beams 85 are carried by the platform 16. These resilient members are arranged in pairs extending transversely of the platform depending therebeneath and in each pair of which the spacing strips 83 are piled. A plunger 86 reciprocates between each pair of these spaced resilient members said plungers being formed at their upper extremities as rack bars 87. The longitudinally extending shafts 88 are provided with the pinions 89 which mesh with and are adapted to reciprocate the plungers by means of which the spacing strips are ejected from their containing receptacles, defined by the resilient members 84, and deposited upon the exposed tier. The shafts 88 are mounted within the bearings 90 and are provided at their extremities with the bevel gears 91 meshing with and driven by the bevel gears 92, the latter being connected by gearing to the shaft 93. A driving shaft 94 registers with the shaft 93 and is provided with a clutch 95 whereby motion is transmitted therebetween. A weight 96 is rigidly secured to and depends from the shaft 93 and always returns to its depending position upon the releasement of the clutch 95.

Shaft 94 is connected to shaft 66 by gears 94$^a$ and 66$^a$, and thus when the shaft 66 is actuated by engagement of the gears 68 and 69 with its gear 67, to raise or lower the carriage, corresponding movement is communicated to the several plungers 86. In this way each time the carriage is lowered during the operation of the machine and upon the completion of a tier of lumber, the necessary series of spacing strips for spacing the next tier of boards, are automatically released.

The apparatus as thus constructed is entirely automatic, it being only necessary to feed the lumber upon the conveyer 32 and maintain the first board of each tier of uniform width so that the side edges of the lumber pile will be straight and uniform. Although the diagrammatic views of Figs. 5, 6 and 7 disclose a mechanism whereby each tier will be composed of four boards, it will be understood that this number is purely arbitrary and may be varied as desired consistent with the successful and practical operation of the machine.

Having thus described our inventions, what we claim is:—

1. An apparatus of the character described, comprising an elevating carriage, a car mounted thereon, a frame extending above said carriage, means for delivering boards to said frame, intermittently actuated means carried by said frame to receive and move the boards one at a time across the car and deposit them in spaced relation thereon, said means including an element automatically controlling the operation thereof and arranged in the path of movement of the boards, and means for depositing transverse strips upon each series of boards.

2. A lumber stacker comprising a transportable receiving device, means for delivering boards thereto, automatic means for engaging said boards one at a time and moving the same across said car in spaced relation to the other boards, and means whereby to automatically control said last named means by the movements of the boards upon said delivering means.

3. A lumber stacker comprising a transportable receiving device, means for delivering boards thereto, automatic means for engaging said boards one at a time and moving the same across said car in spaced relation to the other boards, means whereby to automatically control said last named means by the movements of the boards upon said delivering means, and automatic means for lowering said receiving device upon the completion of each tier of boards.

4. A lumber stacker comprising a frame, a vertically movable carriage carried thereby, a conveyer adapted to deliver boards to said frame above said carriage, an intermittently movable spacing and arranging conveyer extending across said carriage adapted to receive lumber from the first mentioned conveyer and intermittently move the same across said carriage, means for automatically moving the said spacing and arranging conveyer, actuated by each board conveyed thereto; and automatic means arranged in the path of motion of said lumber adapted to lower said carriage upon the completion of each horizontal tier of board.

5. A lumber stacker comprising a frame, a vertically reciprocating carriage mounted thereon, a lumber conveyer adapted to separately deliver boards to said frame, a spacing and arranging conveyer extending across said carriage adapted to arrange the lumber received from said conveyer in tiers, and automatic means for actuating said spacing and arranging conveyer upon the delivery of a board to said frame.

6. A lumber stacker comprising a movable carriage, means for separately delivering lumber thereto and a conveyer extending above and across said carriage to receive said lumber therebeneath and engage and move the same across said car and automatic means including an arm arranged in the path of delivery of said lumber adapted to actuate said conveyer upon the delivery of a strip of lumber to said carriage while in actual contact with said arm.

7. A lumber stacker comprising a vertically movable carriage, means for raising and lowering the same, a car carried by said carriage, a conveyer for delivering lumber to the edge of said car, an intermittently operating conveyer extending above and across said car separately engaging each strip of lumber as delivered thereto and moving the same across said car in spaced relation to the other strips, means for controlling said intermittent conveyer by the action of said delivery conveyer and means engaging said lowering mechanism for automatically lowering said car upon the completion of each horizontal tier of lumber.

8. A lumber stacker comprising a frame, a carriage mounted for vertical movement therein, mechanical means for raising and lowering said carriage, a transportable car mounted upon said carriage, a conveyer adapted to separately deliver lumber to and upon one edge of said car, means extending across said car adapted to engage the lumber delivered to the edge thereof and move the same across the car in spaced relation, a wiper arm arranged in the path of delivery of said lumber adapted to operate said means upon the delivery of each board to the car, a raising and lowering mechanism for said carriage, and a wiper arm arranged in the path of movement of the boards as they are moved across the car, for automatically operating said lowering mechanism upon the completion of each tier of lumber, and means for automatically depositing spacing strips upon and transverse of each tier of lumber upon the car, substantially simultaneous with the actuation of said lowering mechanism.

9. A lumber stacker comprising a frame, a carriage mounted for vertical movement thereon, mechanical means for raising and lowering said carriage, a transportable car mounted upon said carriage, a conveyer adapted to separately deliver lumber to and upon the one edge of said car, means extending above said car adapted to engage the lumber delivered to the edge and move the same across said car maintaining the same in spaced relation, a wiper arm arranged in the path of delivery of said lumber adapted to operate said means upon the delivery of each board to said car, a raising and lowering mechanism for said carriage, and a wiper arm arranged in the path of movement of the boards as they are moved across the car adapted to automatically operate said lowering mechanism upon the completion of each tier of lumber.

10. A lumber stacker including a frame, a carriage adjustable vertically in the frame, a conveyer for delivering boards to the frame, a spacing and arranging conveyer within the frame which receives the boards from the delivery conveyer, a driven shaft, mechanical connection between the said shaft and said spacing and arranging conveyer and including normally spaced gear member and connections for engaging said gear members including a controlling element arranged in the path of movement of the boards, and a truck within the frame upon which the boards are stacked.

11. A lumber stacker including a frame, a carriage adjustable vertically within the frame, a conveyer for delivering boards to the frame, a spacing and arranging conveyer within the frame which receives the boards from the delivery conveyer, a driven shaft, means for vertically adjusting the said carriage including mechanical connections extending therefrom to the said driven shaft and having normally spaced gears, and connections for engaging said gears including an automatic controlling element arranged in the path of movement of the boards, and a truck upon which the said boards are stacked.

12. A lumber stacker comprising a frame, a carriage mounted for vertical movement thereon, mechanical means for raising and lowering said carriage, a transportable car mounted upon said carriage, a conveyer adapted to initially deliver lumber to and upon one edge of said car, means extending above said car adapted to engage the lumber delivered to the edge thereof and move the same across the car, a wiper arm arranged in the path of delivery of said lumber and adapted to operate said means upon the delivery of each board to said car, a raising and lowering mechanism for said carriage, and means in the path of movement of the board as they move across the car adapted to automatically operate said lowering mechanism upon the completion of each tier of lumber.

13. A lumber stacker comprising means for delivering and arranging lumber in horizontal tiers, means adapted to receive said tiers thereon, and means for depositing spacing strips upon each tier adapted to maintain the tiers in spaced superposed relation, including magazines for holding the spacing strips, plungers operating the said magazines for feeding the strips therefrom, and means under control of the lumber for actuating the said plungers.

14. A lumber stacker comprising means for delivering and arranging lumber in horizontal tiers, means adapted to receive said tiers thereon, and means for depositing the spacing strips upon each tier adapted to maintain the tiers in spaced superposed relation, said means including pairs of resilient members forming holders and between which the spacing strips are frictionally held in vertical series, plungers movable vertically and downwardly between the said resilient members and against the series of spacing strips, whereby to lower the series and discharge the lowermost strip of each series from its said holder, and means for actuating the said plungers.

15. A lumber stacker comprising a transportable receiving device, a conveyer for delivering boards to said receiving device, automatic means for engaging said boards one at a time and moving the same across said car in spaced relation to the other boards, means whereby to automatically control said last named means by the movements of the boards upon said delivering conveyer, and means for automatically adjusting the said receiving device in a vertical direction upon the completion of each tier of boards.

GEO. A. BAKER.
FRANK DU VALL.

Witnesses:
JOHN C. BROWN,
E. H. SAUNDERS.

Copies of this patent may be obtained for five cents each, by addressing the "Commissioner of Patents, Washington, D. C."